(12) United States Patent
Breault

(10) Patent No.: US 11,155,200 B2
(45) Date of Patent: Oct. 26, 2021

(54) LOAD HAULER

(71) Applicant: Paradox Access Solutions Inc., Acheson (CA)

(72) Inventor: Derek Breault, Acheson (CA)

(73) Assignee: Paradox Access Solutions Inc., Acheson (CA)

(*) Notice: Subject to any disclaimer, the term of this patent is extended or adjusted under 35 U.S.C. 154(b) by 0 days.

(21) Appl. No.: 16/503,362

(22) Filed: Jul. 3, 2019

(65) Prior Publication Data

US 2020/0353857 A1    Nov. 12, 2020

(30) Foreign Application Priority Data

May 6, 2019 (CA) ................ CA 3042327

(51) Int. Cl.
*B60P 7/08* (2006.01)
*B60P 7/10* (2006.01)
*B60P 3/00* (2006.01)

(52) U.S. Cl.
CPC .. *B60P 7/10* (2013.01); *B60P 3/00* (2013.01)

(58) Field of Classification Search
CPC .... B60P 7/10; B60P 3/00; B60P 7/065; B60P 1/02; B60P 1/4414; B60P 1/48; B60P 1/6445; B60D 1/58
USPC ............................................. 410/32, 90, 91
See application file for complete search history.

(56) References Cited

U.S. PATENT DOCUMENTS

| 2,941,818 | A | * | 6/1960 | Hubbard | B62D 53/068 |
| 3,117,804 | A | | 1/1964 | Bistrom | |
| 3,355,043 | A | | 11/1967 | Talbert | |
| 3,441,158 | A | | 4/1969 | Wilson | |
| 4,078,818 | A | | 3/1978 | Donnelly | |
| 4,702,510 | A | | 10/1987 | Davis | |
| 4,740,005 | A | | 4/1988 | Babin | |
| 4,948,326 | A | | 8/1990 | Bedard | |
| 6,669,433 | B1 | * | 12/2003 | De Kock | B60P 1/6463 |
| 7,029,226 | B2 | | 4/2006 | Walsh | |
| 7,926,831 | B2 | | 4/2011 | Blair | |
| 8,142,135 | B2 | | 3/2012 | Lundin | |
| 9,663,017 | B2 | | 5/2017 | Ellis et al. | |
| 2009/0162162 | A1 | * | 6/2009 | Manesis | B60P 7/10 410/100 |

FOREIGN PATENT DOCUMENTS

CA    2911836 A1    1/2016
WO    8002127 A1    10/1980

* cited by examiner

*Primary Examiner* — Stephen T Gordon
(74) *Attorney, Agent, or Firm* — Christensen O'Connor Johnson Kindness PLLC

(57) ABSTRACT

A mat hauler, comprising a fifth wheel tractor having a chassis and a fifth wheel hitch. A mat elevating mechanism is secured to the chassis. A frame is supported by the mat elevating mechanism. The frame provides a minimum of four mat contacting elements. The mat elevating mechanism may be pneumatic.

7 Claims, 5 Drawing Sheets

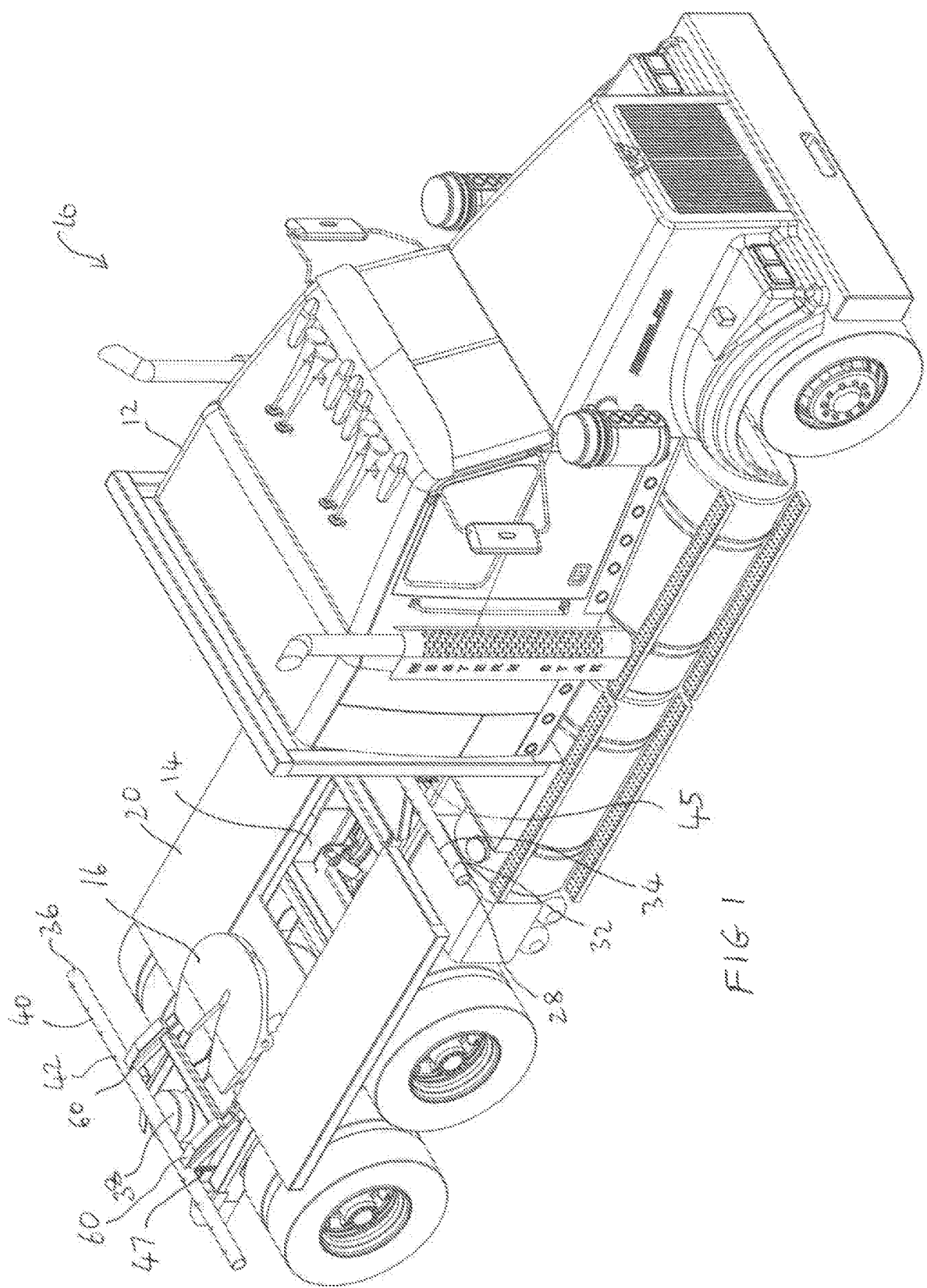

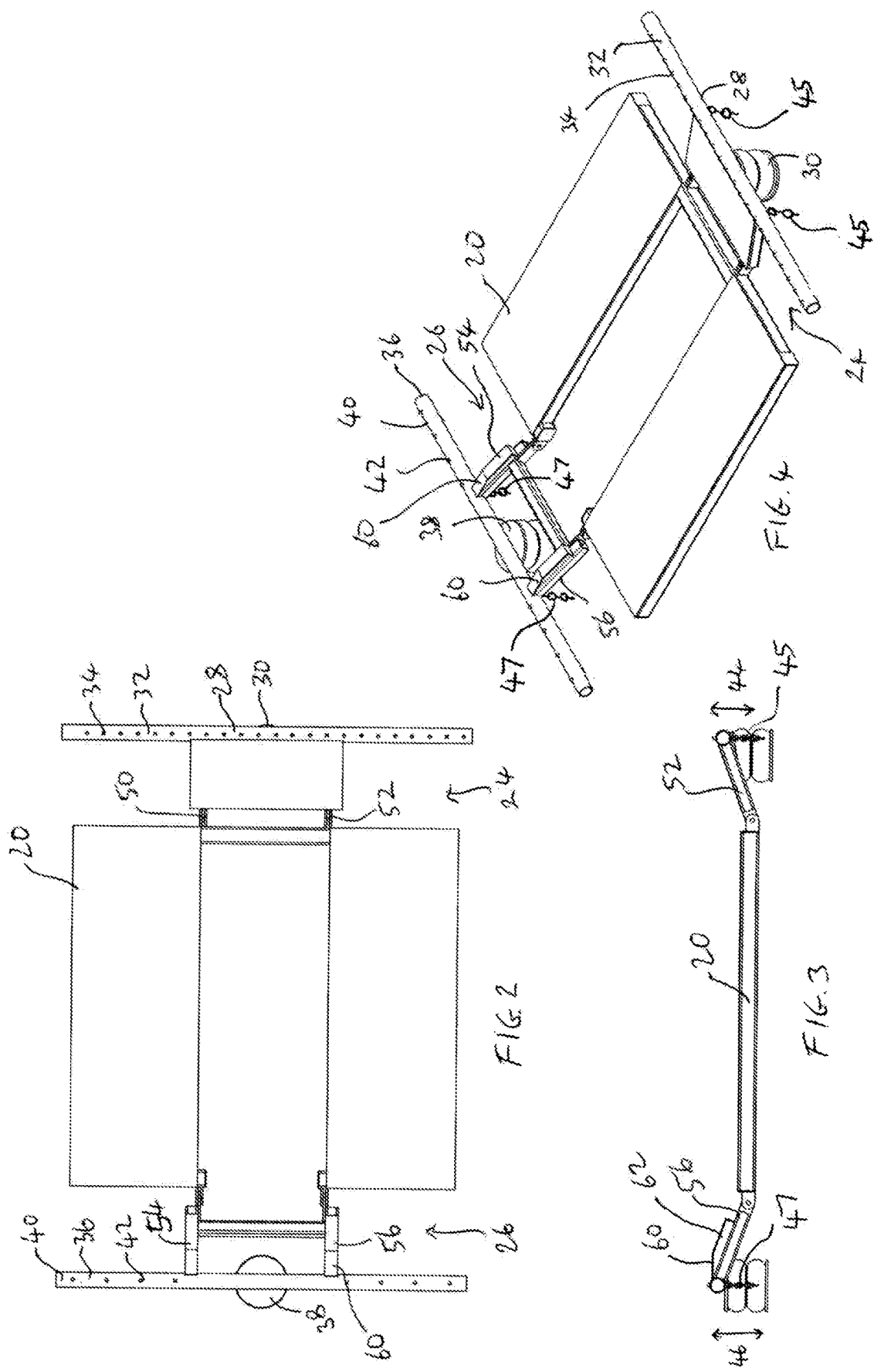

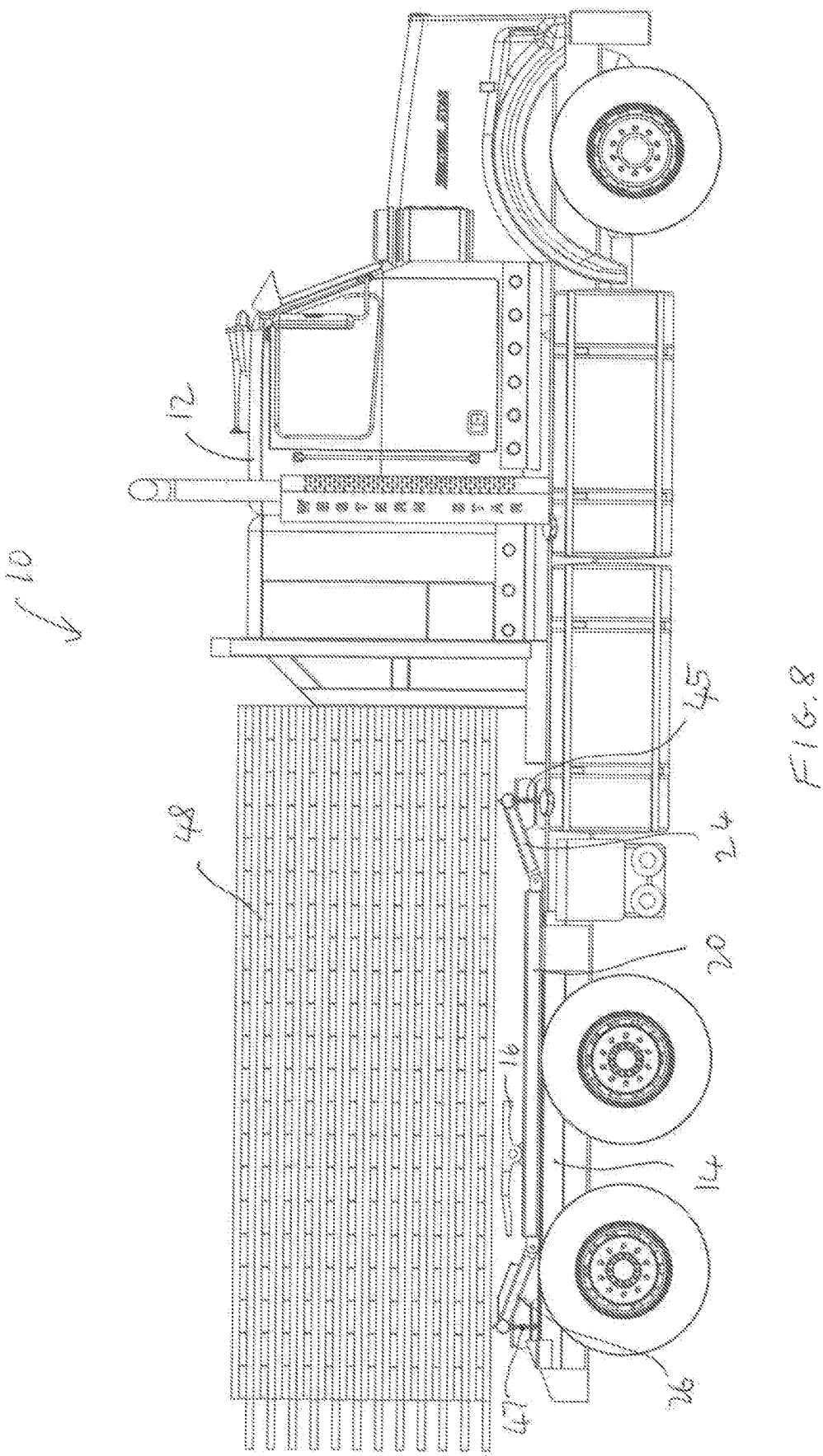

LOAD HAULER

TECHNICAL FIELD

Load transport, particularly of industrial mats.

BACKGROUND

Mats are used in the oil industry to support equipment in the field above a ground surface and prevent damage to the ground surface. Large facilities may require hundreds of mats. It can be inconvenient to transport the mats on trailers.

SUMMARY

There is proposed a system for hauling mats or other loads on tractor trailer units. The claims recite the structure of various embodiments of the system. A load hauler may comprise a fifth wheel tractor having a chassis and a fifth wheel hitch, a load elevating mechanism secured to the chassis and a frame supported by the load elevating mechanism, the frame providing a minimum of four load contacting elements forming load contact points. At least two load contact points may be forward of the fifth wheel hitch, at least two load contact points may be left of the fifth wheel hitch (looking forward), at least two load contact points maybe rearward of the fifth wheel hitch, and at least two load contact points may be right of the fifth wheel hitch (looking forward).

A mat hauler may comprise a fifth wheel tractor having a chassis and a fifth wheel hitch, a frame secured to the chassis, the frame having a forward part and rearward part, a forward bar mounted on the forward part of the frame, the forward bar being supported for vertical motion by a forward lifting mechanism, the forward bar having a forward bar upper part with forward bar mat contacting elements, a rearward bar mounted on the rearward part of the frame, the rearward bar being supported for vertical motion by a rearward lifting mechanism, the rearward bar having a rearward bar upper part with rearward bar mat contacting elements, the forward lifting mechanism having a first lifting range, the rearward lifting mechanism having a second lifting range and the first lifting range and second lifting range being sufficient that a mat placed on both the forward bar and the rearward bar is held above the fifth wheel hitch in operation.

A mat support structure may comprise a frame adapted to be secured to a chassis or frame of a vehicle that has a fifth wheel hitch, the frame having a forward part and rearward part, a forward bar mounted on the forward part of the frame, the forward bar being supported for vertical motion by a forward lifting mechanism, the forward bar having a forward bar upper part with forward bar mat contacting elements, a rearward bar mounted on the rearward part of the frame, the rearward bar being supported for vertical motion by a rearward lifting mechanism, the rearward bar having a rearward bar upper part with rearward bar mat contacting elements, the forward lifting mechanism having a first lifting range, the rearward lifting mechanism having a second lifting range and the first lifting range and second lifting range being sufficient that a mat placed on both the forward bar and the rearward bar is held above the fifth wheel hitch in operation.

The forward lifting mechanism may comprise a first pneumatic jack disposed between the forward bar and the chassis or the frame. The forward lifting mechanism may comprise side bars, each side bar being pivotally attached to the frame. The rearward lifting mechanism may comprise a second pneumatic jack disposed between the rearward bar and the chassis or frame. The rearward lifting mechanism may comprise side bars, each side bar being pivotally attached to the frame. Either or both the forward bar load contacting elements and the rearward bar load contacting elements comprise load gripping elements.

BRIEF DESCRIPTION OF THE FIGURES

Embodiments will now be described with reference to the figures, in which like reference characters denote like elements, by way of example, and in which:

FIG. 1 is perspective view of a mat hauler;

FIG. 2 is top view of a mat elevating mechanism;

FIG. 3 is a side view of a mat elevating mechanism;

FIG. 4 is a perspective view of a mat elevating mechanism;

FIG. 5 is a side view of a mat elevating mechanism in a position to elevate mats above a fifth wheel hitch;

FIG. 6 is a side view of a mat elevating mechanism in a position for regular use of the tractor;

FIG. 8 is a side view of the mat hauler of FIG. 1 loaded with mats.

DETAILED DESCRIPTION

Figure 7:
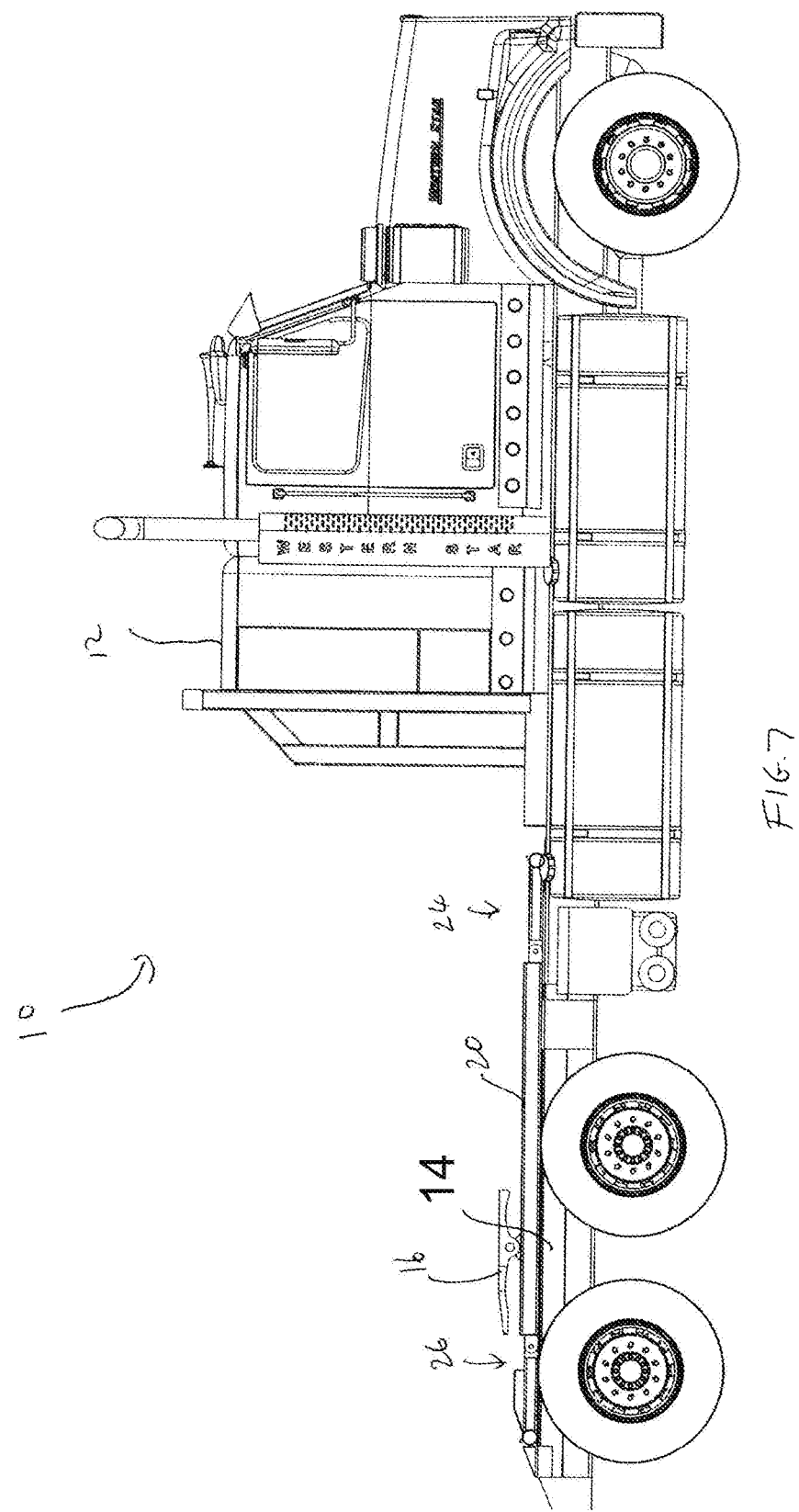
FIG. 7 is a side view of the mat hauler of FIG. 1 in configuration for using the fifth wheel hitch in conventional fashion.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Definitions: a fifth wheel tractor comprises the truck or tractor of a tractor and trailer combination that has a firth wheel on the back of the tractor; a chassis is the frame of the firth wheel tractor; forward and rearward in relation to the fifth wheel tractor mean respectively in the direction of normal forward and rearward travel of the fifth wheel tractor; a lifting range is the distance that a mechanism can lift a load.

Referring to FIG. 1, there is shown a mat hauler 10. A fifth wheel tractor 12 has a conventional chassis 14 and a conventional fifth wheel hitch 16. A frame 20 is secured to the chassis 14 by any suitable means. The frame 20 has a forward part 24 and rearward part 26. A forward bar 28, which may be cylindrical, is mounted on the forward part 24 of the frame 20. The forward bar 28 is supported for vertical motion by a forward lifting mechanism 30. The forward bar 28 has a forward bar upper part 32 with forward bar mat contacting elements 34. A rearward bar 36 is mounted on the rearward part 26 of the frame 20. The rearward bar 36 is supported for vertical motion by a rearward lifting mechanism 38. The rearward bar 36 has a rearward bar upper part 40 with rearward bar mat contacting elements 42. The forward lifting mechanism 30 has a first lifting range 44. The rearward lifting mechanism 38 has a second lifting range 46. The first lifting range 44 and second lifting range 46 are sufficient that a lowermost mat of a pile of mats 48 (see FIG. 8) placed on both the forward bar 28 and the rearward bar 36 passes above the fifth wheel hitch 16 in operation of the tractor for hauling mats. The lifting ranges 44 and 46 are set by chains 45 and 47 that connect between the bars 28 and 36 respectively and the chassis 14 of the fifth wheel tractor. The chains 45 and 47 limit the movement of the bars 28 and 36 and hold the frame 20 parallel when the load is supported by the jacks 30 and 38. The frame 20 may be secured to the truck chassis 14 by any suitable means, such as bolts, which may be U-bolts that pass around the chassis 14 and are bolted to the frame 20, such as the underside of plates that form part of the frame 20.

The frame 20 is shown in FIGS. 2-4. The frame may be rectangular and made of two plates side by side connected at the ends by bars 50, 52, 54 and 56, though in some embodiments other configurations are possible. A cross bar may connect bars 50 and 52, and another cross bar may connect bars 54 and 56. The plates may be secured by any suitable means to the chassis 14.

Figures 5, 6:
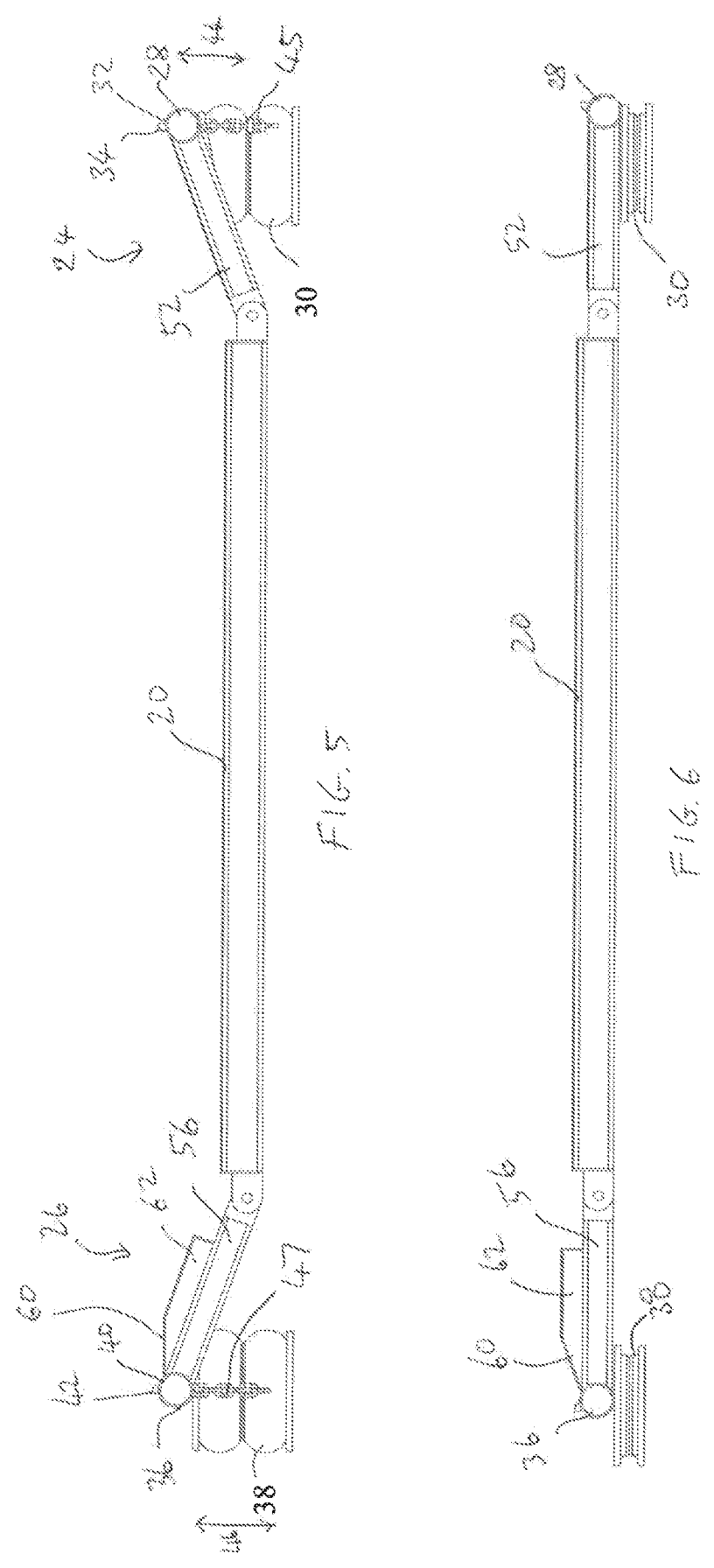

The forward lifting mechanism 30 and rearward lifting mechanism 38 together comprise a mat elevating mechanism. The elevated position of the frame 20 is shown in FIG. 5, with the bars 28 and 36 elevated to a level where mats placed on the bars 28 and 36 will be above a fifth wheel hitch. In the elevated position, the lifting mechanisms 30 and 38 are activated to lift the bars 28 and 36 respectively. The lowered position of the frame 20 is shown in FIG. 6 with the lifting mechanisms 30 and 38 deactivated, and the bars 28 and 36 lowered to the point where they do not interfere with operation of the fifth wheel hitch 16.

The forward lifting mechanism 30 may comprise a pneumatic jack, such as an air shock or air spring common on air ride suspensions, disposed between the forward bar 28 and the chassis 14 or the frame 20. Pneumatic jacks are flexible and capable of conforming to the angle of elevation with sufficient force to lift a large number of mats. The forward lifting mechanism 30 may comprise side bars 50, 52 (see FIGS. 5 and 6), each side bar 50, 52 being pivotally attached to the frame 20. The rearward lifting mechanism 38 may comprise a second pneumatic jack disposed between the rearward bar 36 and the chassis 14 or frame 20. The rearward lifting mechanism 38 may comprise side bars 54, 56, each side bar 54, 56 being pivotally attached to the frame 20.

Either or both the forward bar mat contacting elements 34 and the rearward bar mat contacting elements 42 may comprise mat gripping elements. The mat gripping elements may comprise nuts threaded onto bolts in the respective bars 28 and 36, or the heads of bolts, and may have angular or sharp or edged surfaces, rather than rounded surfaces, for contacting the mats in a way that helps prevent the mats 48 falling off the mat hauler. The elements 34 and 42 together provide a minimum four contact points with a set of mats 48.

The bars 28, 36 may extend laterally beyond the side bars 50, 52, 54 and 56 for stabilizing of the load of mats 48 so that the four contact points are near the outside of the envelope bounding the fifth wheel tractor. Thus, at least two mat contact points may be forward of the fifth wheel hitch, at least two mat contact points may be left of the fifth wheel hitch (looking forward), at least two mat contact points may be rearward of the fifth wheel hitch, and at least two mat contact points may be right of the fifth wheel hitch (looking forward). Only four mat contact points are needed to achieve this configuration, but more contact points may be used. The side bars 50, 52, 54, 56 may be inline with the girders forming the chassis 14 but secured to the frame 20, or may be pivotally secured to the girders.

For installation of the frame 20 on a fifth wheel tractor 12, the mud flaps of the fifth wheel tractor 12 are taken off and the fifth wheel hitch 16 is elevated as seen in FIG. 7 so that it may be accessed by a trailer. As shown in FIGS. 3-6 in particular, a ramp 60 on a block 62 secured to the upper side of each of the side bars 54 and 56 provide a smooth passage of a trailer pin to the fifth wheel hitch 16 when the mat hauler 10 is not in use for hauling mats. Other loads besides mats may be carried by the mat hauler, for example tanks.

The pneumatic jacks or other load lifting devices may be powered by the systems existing on a conventional fifth wheel tractor, and operated from the cab, or by a standalone control mounted elsewhere on the fifth wheel tractor, or a control that may be hand held. Once actuated, the jacks lift the frame above the fifth wheel hitch until they are limited by a motion limiter for example chains attached to the chassis of the fifth wheel tractor. Mats or other loads may then be placed on the frame, supported by the load contact points, by any suitable means such as a loader.

The invention claimed is:

1. A load hauler, comprising:
   a fifth wheel tractor having a chassis and a fifth wheel hitch;
   a load elevating mechanism secured to the chassis;
   a frame supported by the load elevating mechanism, the frame providing a minimum of four load contacting elements forming load contact points;
   the load elevating mechanism comprising:
      a forward bar mounted on a forward part of the frame, the forward bar being supported for vertical motion by a forward lifting mechanism, the forward bar having a forward bar upper part with forward bar load contacting elements forming at least two of the load contact points;
      a rearward bar mounted on a rearward part of the frame, the rearward bar being supported for vertical motion by a rearward lifting mechanism, the rearward bar having a rearward bar upper part with rearward bar load contacting elements forming at least two of the load contact points;
      the forward lifting mechanism having a first lifting range;
      the rearward lifting mechanism having a second lifting range; and
      the first lifting range and the second lifting range being sufficient that a load placed on both the forward bar and the rearward bar is held above the fifth wheel hitch in operation.

2. The load hauler of claim 1 in which at least two of the load contact points are forward of the fifth wheel hitch, at least two of the load contact points are left of the fifth wheel hitch from a perspective defined by a forward direction of the fifth wheel tractor, at least two of the load contact points are rearward of the fifth wheel hitch, and at least two of the load contact points are right of the fifth wheel hitch from a perspective defined by the forward direction of the fifth wheel tractor.

3. The load hauler of claim 1 in which the forward lifting mechanism comprises a first pneumatic jack disposed between the forward bar and the chassis or the frame.

4. The load hauler of claim 1 in which the forward lifting mechanism comprises side bars, each side bar being pivotally attached to the frame.

5. The load hauler of claim 3 in which the rearward lifting mechanism comprises a second pneumatic jack disposed between the rearward bar and the chassis or frame.

6. The load hauler of claim 1 in which the rearward lifting mechanism comprises side bars, each side bar being pivotally attached to the frame.

7. The load hauler of claim 1 in which either or both the forward bar load contacting elements and the rearward bar load contacting elements comprise load gripping elements.

\* \* \* \* \*